United States Patent [19]

Deschamps et al.

[11] 4,251,495
[45] Feb. 17, 1981

[54] PROCESS FOR PURIFYING A HYDROGEN SULFIDE CONTAINING GAS

[75] Inventors: André Deschamps, Noisy Le Roi; Sigismond Franckowiak; André Sugier, both of Rueil Malmaison, all of France

[73] Assignee: Institut Francais du Petrole, Rueil-Malmaison, France

[21] Appl. No.: 64,679

[22] Filed: Aug. 8, 1979

[30] Foreign Application Priority Data

Aug. 8, 1978 [FR] France ............................... 78 23666

[51] Int. Cl.$^3$ ............................................. B01D 53/34
[52] U.S. Cl. ................................ 423/230; 423/541 R; 423/557; 252/411 S
[58] Field of Search .................. 423/230, 541 R, 557; 252/411 S

[56] References Cited

U.S. PATENT DOCUMENTS

| | | | |
|---|---|---|---|
| 2,747,968 | 5/1956 | Pigache | 423/230 |
| 3,079,223 | 2/1963 | Lewis | 423/230 |
| 3,778,501 | 12/1973 | Lang et al. | 423/541 X |
| 4,008,174 | 2/1977 | Jacobson et al. | 423/230 X |

Primary Examiner—Earl C. Thomas
Attorney, Agent, or Firm—Millen & White

[57] ABSTRACT

Process for purifying a gas containing hydrogen sulfide, optionally with carbon dioxide, particularly adapted to the purification of gases of relatively low hydrogen sulfide content, e.g. not in excess of 1% of $H_2S$ by volume, comprising contacting the gas with an absorption mass containing copper, at a temperature of from 250° to 550° C., to absorb the hydrogen sulfide and form copper sulfide; wherein the absorption mass is regenerated by interrupting the contact of the gas with the mass when the mass is at least partially saturated, contacting the mass with an oxidizing gas containing from 0.5 to 5% by volume of oxygen, at a temperature of from 250° to 345° C., to convert the copper sulfide substantially to copper sulfate, and then contacting the mass with a reducing gas containing from 5 to 20% by volume of hydrogen, at a temperature of from 300° to 450° C., to convert the copper sulfate substantially to sulfur dioxide and metallic copper, thereby regenerating the mass, which is then contacted again by the hydrogen sulfide containing gas.

11 Claims, No Drawings

PROCESS FOR PURIFYING A HYDROGEN SULFIDE CONTAINING GAS

This invention concerns a process for purifying a gas containing hydrogen sulfide, by means of absorption masses containing metallic copper. It concerns more particularly the regeneration of said masses in order to reuse them in the process.

Numerous industrial gases contain hydrogen sulfide; there can be mentioned, for example, the effluents from sulfur producing units making use of the Claus process, natural gas, synthesis gas, fuel gas produced in refineries or in units for coal or hydrocarbons conversion, hydrocarbon charges destined to be fed to steam-reforming units or recycle gas from hydrotreatment units.

The best known processes for removing hydrogen sulfide from these gases are processes of the wet type, making use of a liquid phase, for example an alkanolamine aqueous solution. These processes require the cooling of the gases before their washing, thereby giving rise to technological difficulties, loss of energy and sometimes difficulties for the discharge of the polluted water resulting from the condensation of the steam contained in the gases. Moreover, according to these techniques, carbon dioxide is usually removed together with hydrogen sulfide and this is not always desirable.

Thus, in the case of effluents from the hydrocarbon or coal conversion units, having a high carbon dioxide content, the simultaneous removal of hydrogen sulfide and carbon dioxide makes much more complicated the further conversion of hydrogen sulfide to sulfur.

Many authors have already suggested to remove $H_2S$ from a gas by fixation thereof on masses containing metals or metal oxides, for example ZnO, $Fe_2O_3$, Cu or CuO. The advantage of these techniques is to provide for a selective absorption of $H_2S$, for example in the presence of $CO_2$, and they do not require the cooling of the gas. Nevertheless, the use of such techniques was for a long time limited to the removal of $H_2S$ traces, due to the impossibility of satisfactorily regenerating the used absorbing masses. The regeneration methods which have been proposed generally operate by oxidation of the one or more metal sulfides so as to produce $SO_2$ and a metal oxide capable to fix again $H_2S$. During the oxidation a portion of the sulfide tends to oxidize to sulfate which is further reduced by $H_2S$ with formation of $SO_2$ not retained in the mass, thereby reducing the efficiency of the gas desulfurization. In order to meet with this drawback it has been recommended to proceed to the oxidation at high temperature (700°–900° C.) so as to thermally decompose the sulfates. The disadvantages of said method are to result in a rapid degradation of the chemical and mechanical properties of the mass (sintering) and to require a costly technology (high temperature).

It has also been proposed, particularly in the case of masses based on copper, to proceed to the regeneration in two steps by contacting the mass in a first step with an oxidizing gas at a temperature from 350° to 800° C., so as to remove as $SO_2$ about one half of the fixed sulfur, and then in a second step by contacting the mass with a reducing gas so as to produce the evolution as $SO_2$ of the remaining sulfur (U.S. Pat. No. 2,747,968). This technique is effective to decompose copper sulfate and avoids the above-mentioned disadvantages but the fact that $SO_2$ is diluted in two gas effluents, one of the oxidizing type and the other, of the reducing type, considerably complicates its recovery or conversion to sulfur.

It has finally been proposed, in the case of masses consisting of copper and chromium deposited on a carrier of active carbon, to proceed to the regeneration also in two steps consisting of an oxidation at a temperature from 93° to 218° C., followed with a reduction of the formed sulfate at a temperature from 150° to 260° C. (U.S. Pat. No. 4,008,174). In this case, sulfur is removed as $SO_2$ exclusively during the reduction step but it has been observed that a substantial portion of the copper sulfate is reduced to CuS and $Cu_2S$, which results in an incomplete regeneration of the mass and, accordingly, in a substantial decrease of its capacity to fix $H_2S$.

It has now been found that it is possible to remove the hydrogen sulfide contained in a gas stream optionally containing carbon dioxide, steam, sulfur dioxide or other inert gases, while avoiding the above-mentioned drawbacks, by making use of an absorption mass containing metallic copper, which during a subsequent regeneration, provides a gas of high sulfur dioxide content, by proceeding in two steps: (a) a first step, making use of an oxidizing gas, which converts copper sulfide to copper sulfate and then (b) a second step, making use of a reducing gas, to produce sulfur dioxide, provided that the operation is conducted in conformity with the critical temperature values mentioned below.

This process has substantial advantages which are to permit the regeneration of the absorption mass at a relatively low temperature, and to produce a final gas of high sulfur dioxide content, which makes its subsequent use easier.

Moreover, the different steps may be conducted substantially at the same temperature.

The process consists of contacting a hydrogen sulfide containing gas with a solid absorption mass containing metallic copper, so as to absorb $H_2S$ while forming copper sulfide, interrupting the contact of the gas with the mass when the latter is at least partially saturated, then passing over said mass a first gas, containing oxygen, at 250°–345° C., to form copper sulfate without noticeable evolution of $SO_2$ and then a second gas, containing a reducing agent, at 300°–450° C. to produce a gas effluent containing sulfur dioxide and the interrupting the gas flow and passing again a hydrogen sulfide containing gas over the so-regenerated mass.

The absorption solid masses used for absorbing hydrogen sulfide and, if any, other sulfur compounds such as carbon disulfide and carbon oxysulfide, consist essentially of metallic copper, copper oxide or a copper salt, for example copper carbonate or copper nitrate, deposited on a suitable carrier. As carrier, there can be used activated alumina such as ν-alumina, but substances such as silica, silica-aluminas, calcium, barium or magnesium silico-aluminates or aluminous cements are also convenient. A particularly preferred carrier is an alumina having a surface from 1 to 50 $m^2/g$ and whose mechanical properties are substantially unchanged in the course of time.

The copper content of these masses may vary within a wide range, for example from 5 to 70 % by weight. The best results are obtained with masses containing from 5 to 40 % by weight of copper.

The preparation of these masses may be performed in different ways, for example by agglomerating copper oxide, metallic copper or copper salts with a carrier, for example a refractory cement. The resulting material is then formed into the desired shape, such as pellets extrudates or pills, and then dried and finally roasted at a temperature of about 200° to 400° C.

Another procedure consists of impregnating the carrier with a solution of copper salts such, for example, as copper nitrate, acetate or sulfate and then drying and roasting as mentioned above.

The so-roasted mass wherein copper is present as oxide can be used without inconvenience for a first absorption of hydrogen sulfide. After the first regeneration, the copper contained in the mass is in the metallic state. It is also possible, if so desired, to proceed to a reduction of the copper oxide to metallic copper before the first absorption of hydrogen sulfide.

The so-prepared contact masses are convenient for the removal of hydrogen sulfide contained in a non-oxidizing gas. The gas may contain substantial amounts of hydrogen without inconvenience.

The minimum operating temperature for absorbing $H_2S$ is about 250° C. It is however possible to proceed at as high a temperature as 1000° C.; however, in order to avoid deteriorating the mass by sintering, it is preferable not to exceed about 550° C. The preferred temperature range is from 250° to 450° C.

The usual VVH (gas volume per mass volume and per hour) is from 100 to 10,000, preferably from 1,000 to 4,000.

The operation can be conducted under atmospheric pressure or under higher pressure, for example up to 100 bars, according to the requirements.

During the contact of the treated gas with the absorption mass, hydrogen sulfide is mainly fixed in accordance with the following reactions:

$$H_2S + 2Cu \rightarrow Cu_2S + H_2$$

$$H_2S + Cu \rightarrow CuS + H_2$$

It is apparent that the hydrogen produced from the hydrogen sulfide remains in the purified gas, which in some cases of use of such a gas (e.g. hydrotreatment) results in a noticeable advantage.

At lower temperatures, under the conditions of the invention, the rate of fixation of hydrogen sulfide would be too low for being advantageously used.

The hydrogen sulfide content of the gas to be purified may be lowered by several percents down to amounts which may in some cases be lower than 1 ppm (by volume). The amount of hydrogen sulfide in the gas to be treated is not limitative for the invention; however, the process is particularly adapted to the treatment of gases of relatively low hydrogen sulfide content, for example not in excess of 1% of hydrogen sulfide by volume.

When it is apparent that the absorption mass is practically saturated, i.e. when the amount of hydrogen sulfide in the effluent gas becomes higher than a predetermined amount, the passage of gas to be treated is discontinued in order to proceed to the regeneration of the mass.

This regeneration is conducted in two steps:

(a) A first step of oxidizing copper sulfide to copper sulfate.

In this step, copper sulfides are oxidized to copper sulfate in such conditions as to avoid the evolution of sulfur compounds. Thus, the produced gas, of lower oxygen content, may be discharged to the atmosphere without polluting the same.

The following reactions mainly occur:

$$Cu_2S + 5/2O_2 \rightarrow CuSO_4 + CuO$$

$$CuS + 2O_2 \rightarrow CuSO_4$$

This is achieved by contacting an oxidizing gas with the absorption mass containing copper sulfide, at a temperature from 250° to 345° C., by making use preferably of an oxidizing gas containing from 0.5 to 5% by volume of oxygen and, more preferably, from 1 to 3%.

The preferred temperature is from 300° to 340° C.

This can be achieved by diluting the oxidizing gas, air for example, with steam or an inert gas. In particular, it is possible to use for this purpose a recycling of the gas of lower oxygen content obtained after a first passage over the mass, after cooling thereof. The VVH is preferably from 500 to 5,000.

(b) A second step of reducing copper sulfate to copper and sulfur dioxide according to the reaction:

$$CuSO_4 + 2H_2 \rightarrow SO_2 + 2H_2O + Cu$$

The reduction of copper sulfate to metallic copper with evolution of sulfur dioxide is conducted by maintaining the oxidized mass in contact with the reducing gas at a temperature in the range from 300° to 450° C.

It has been observed that, when the reduction is conducted at a temperature lower than 300° C., a substantial amount of copper sulfate is reduced to copper sulfide without evolution of sulfur dioxide, which has the effect of reducing the $H_2S$ absorption capacity of the mass. The use of temperatures higher than 450° C. does not improve the decomposition of copper sulfate and speeds up the aging of the mass. The preferred temperature ranges from 350° to 430° C.

As reducing gas, there is preferably used hydrogen. Industrial gases of high hydrogen content and further containing small amounts of carbon monoxide and hydrocarbons, such as the purge gases from catalytic reforming units, the gases obtained by partial oxidation or steam reforming of hydrocarbons, are perfectly convenient. It has been observed that when the hydrogen content of the reducing gas introduced in the reactor is too high, for example higher than 50% by volume, a substantial amount of copper sulfate is reduced to copper sulfide. In order to avoid this disadvantage, the reducing gas is diluted, preferably with steam, so as to maintain a hydrogen content from 5 to 20% by volume. The use of steam as diluent has the advantage to produce, after condensation of water, an effluent of high $SO_2$ content.

The produced sulfur dioxide may be liquefied or converted to sulfuric acid by any known means for a later use.

In the particular case of purifying tail gases of a sulfur producing unit of the Claus type, the sulfur dioxide produced in the regeneration step of the absorption mass may be recycled to the Claus treatment unit.

After regeneration of the mass, a new absorption step with hydrogen sulfide is conducted. It has been observed that it was possible to proceed to a very large number of cycles without substantial decrease of the performances of the mass and without deterioration.

According to an alternative embodiment of the process, when $SO_2$ is also present in the gas to be purified and when $SO_2$ is to be removed from said gas, a reduction of $SO_2$ to $H_2S$ by hydrogen can be performed in the presence of a suitable catalyst for said reaction, e.g.

cobalt molybdate or nickel tungstate. This catalyst may be located upstream the absorption mass or may be admixed with the latter.

The following non-limitative examples 1 and 2 illustrate the invention.

Examples 3 and 4 illustrate the use of the prior technique.

EXAMPLE 1

An absorption mass is prepared by impregnating balls of activated alumina roasted at 800° C. (diameter=2.5 mm, surface=8 $m^2/g$) with a saturated solution of copper nitrate. Then, the obtained mass is dried in a drying oven at 100° C. for one hour and then heated in a furnace at 400° C. for 3 hours. There is obtained an absorption mass containing 20% by weight of CuO.

100 cc of this mass are introduced into a quartz tube (diameter=2 cm, height=60 cm) placed in a tubular furnace whose temperature is adjusted to 340° C.

Then a stream of 100 liters/hour of a gas containing 90% by volume of $N_2$ and 1% by volume of $H_2S$ is passed therethrough.

It is observed that, during two hours, the gas issued from the quartz tube contains less than 10 ppm of $H_2S$. When the $H_2S$ content of the purified gas becomes greater than 100 ppm, the supply of $H_2S$ containing gas is discontinued.

The tube is then fed, while maintaining the temperature at 340° C., with 200 liters/hour of an oxidizing gas containing 98% by volume of $N_2$ and 2% of $O_2$. No evolution of sulfur compounds in the effluent gas is observed.

After 3 hours of run, the oxidizing gas feed is discontinued, nitrogen is used to scavenge the tube and then the latter is fed, at a temperature of 350° C., with a stream of 100 liters/hour of a gas containing 90% by volume of $N_2$ and 10% by volume of $H_2$. A substantial evolution of $SO_2$ and steam is observed.

After 2 hours of run, practically the effluent gas no longer contains $SO_2$. The flow of reducing gas is discontinued and the $H_2S$ containing gas is again supplied. It is observed that, during about 2 hours, the $H_2S$ content of the purified gas remains lower than 10 ppm.

120 cycles have thus been performed without observing any decrease in the rate of removal of $H_2S$ and in the time required for saturating the mass.

EXAMPLE 2

An absorption mass is prepared by admixing 350 g of basic copper carbonate with 650 g of Laffarge 250 cement of aluminous type containing 80% by weight of $Al_2O_3$ and then by forming balls in a ball shaper by pulverization of a 1% aqueous solution of ammonium carbonate. The obtained balls of a diameter from 4 to 6 mm are then brought to a temperature of 80° C. for four hours in a wet atmosphere to allow the cement to set. The balls are then dried for 5 hours at 100° C.

100 cc of this mass are introduced in a quartz tube (diameter=2 cm h=60 cm) placed in a tubular furnace whose temperature is adjusted to 320° C. A stream of 200 liters/hour of a gas composed of 99% by volume of $N_2$ and 1% by volume of $H_2S$ is passed therethrough. There is observed that, during 16 hours, the effluent gas from the reactor contains less than 1 ppm of $H_2S$. When the $H_2S$ content of the purified gas exceeds 3 ppm, the $H_2S$ supply is discontinued and a stream of 200 liters/hour of a gas composed of 98% $N_2$ and 2% $O_2$ is passed at 330° C. through the tubular furnace. No evolution of sulfur compound is observed. After 4 hours of run, the oxidizing gas supply is discontinued and a stream is passed at 380° C. which contains 10 l/h of hydrogen and 100 l/h of steam. A substantial evolution of $SO_2$ and steam is observed. After two hours of run, $SO_2$ no longer evolves and a new cycle is then operated.

After 50 cycles no decrease of the performance of the mass was observed.

EXAMPLE 3

Example 1 is repeated with identical operating conditions except that the temperature of the sulfate reduction step with the hydrogen containing gas is 191° C. as in the example of U.S. Pat. No. 4,008,174.

It is then observed that during the first contact of the $H_2S$ containing gas with the mass, the period during which the effluent gas contains less than 10 ppm of $H_2S$ is about 2 hours. On the contrary, during the second cycle, after the reduction step at 191° C. has been performed, the period during which the effluent gas contains less than 10 ppm of $H_2S$ is only 15 minutes. In less than 30 minutes, the $H_2S$ content of the effluent gas becomes equal to the content of the gas feed charge.

In addition, it is observed that during the reduction step, only traces of $SO_2$ evolve in spite of a noticeable hydrogen consumption. By analysis, it is determined that the copper sulfate reduction has essentially produced copper sulfide and accordingly does not permit regeneration of the desulfurizing properties of the mass.

EXAMPLE 4

Example 1 is repeated under identical operating conditions except that the temperature of the oxidation step is 420° C. as in the U.S. Pat. No. 2,747,968.

It is observed that the desulfurization of the $H_2S$ containing gas is achieved substantially with the same performances as in example 1 with respect to the cycle period and to the purification rate.

On the contrary, during the oxidation step, the effluent gas contains 0.1 to 0.3% by volume of $SO_2$. This $SO_2$ evolution corresponds to 45% of the sulfur fixed as $H_2S$ during the step of treatment of the $H_2S$ containing gas, so that the reduction step does not permit recovery, in a usable form, of more than about 55% of the fixed sulfur.

EXAMPLE 5

100 cc of the mass described in example 1 are introduced into a quartz tube placed in a tubular furnace whose temperature is adjusted to 320° C. A stream of 200 l/h of a gas composed of 80% (by volume) of $N_2$, 15% of $H_2O$, 2% of $H_2$, 1% of $SO_2$, 1% of $H_2S$, 5000 ppm of COS and 5000 ppm of $CS_2$ is passed therethrough. It is observed that during 10 hours the gas evolving from the reactor contains less than 10 ppm of sulfur in the state of $H_2S$, COS and $CS_2$.

What is claimed is:

1. A process for purifying a hydrogen sulfide containing non-oxidizing gas, which comprises contacting the gas with an absorption mass containing copper, at a temperature of from 250° to 550° C., to absorb the hydrogen sulfide and form copper sulfide; wherein the absorption mass is regenerated by interrupting the contact of the gas with the mass when the mass is at least partially saturated, contacting the mass with an oxidizing gas containing from 0.5 to 5% by volume of oxygen, at a temperature of from 250° to 345° C., to convert the copper sulfide substantially to copper sulfate, and then contacting the mass with a reducing gas containing from 5 to 20% by volume of hydrogen, at a temperature of from 300° to 450° C., to convert the copper sulfate substantially to sulfur dioxide and metallic copper, thereby regenerating the mass, which is then contacted again by the hydrogen sulfide containing gas.

2. A process according to claim 1, wherein the hydrogen sulfide containing gas to be purified also contains carbon dioxide.

3. A process according to claim 1, wherein the absorption mass contains from 5 to 70% by weight of copper.

4. A process according to claim 1, wherein the absorption mass is contacted with the oxidizing gas at a temperature of from 300° to 340° C. and then with the reducing gas at a temperature of from 350° to 430° C. in order to regenerate it.

5. A process according to claim 1, wherein the reducing gas contains both hydrogen and steam.

6. A process according to claim 1, wherein the hydrogen sulfide containing gas also contains at least one of carbon oxysulfide and carbon disulfide.

7. A process according to claim 1, wherein the absorption mass contains from 5 to 40% by weight of copper.

8. A process according to claim 1, wherein the hydrogen sulfide containing gas is contacted with the absorption mass at from 250° to 450° C.

9. A process according to claim 1, wherein the hydrogen sulfide content of the gas to be purified is not more than 1% by volume.

10. A process according to claim 1, wherein the oxidizing gas contains from 1 to 3% by volume of oxygen.

11. A process according to claim 1, wherein the oxidizing gas is air diluted with steam or an inert gas.

* * * * *